United States Patent Office 3,116,186
Patented Dec. 31, 1963

3,116,186
EXPLOSIVE COMPOSITION AND PROCESS FOR FABRICATING WEAPON CASES
James T. Paul, Jr., Wilmington, Del., assignor, by mesne assignments, to the United States of America as represented by the Secretary of the Navy
No Drawing. Filed Oct. 20, 1955, Ser. No. 541,867
4 Claims. (Cl. 149—19)

This invention relates to explosive compositions, more particularly, it relates to explosive compositions suitable for fabricating high strength weapon casings.

The chief objective of the invention is the provision of explosive compositions for use in fabricating weapon casings. These compositions should provide a finished article of high physical strength, low impact sensitivity, and high density. Additionally, they should cure at low temperatures.

It has been found that a suitable, tough, flexible, high explosive composition is obtained when polyvinyl chloride or polyvinyl chloride-polyvinyl acetate plastic is mixed with a granular, high melting explosive such as cyclotrimethylene trinitramine or pentaerythritol tetranitrate and a polymerizable monomer or monomer-modified unsaturated polyester, and the mixture cured. The formed mixture is cured by polymerizing the monomers at the same time the polyvinyl chloride is being dissolved in the plasticizer and/or the monomer. Curing is effected at a temperature between 20° and 150° C. The formed product is characterized by a very high impact strength, high physical strength, and high density.

The following examples are illustrative of the invention but not limiting thereof.

*Example 1*

| Component: | Wt. percent |
|---|---|
| Cyclotrimethylene trinitramine | 50.0 |
| Vinylite (VYNV) | 20.8 |
| Butyl methacrylate | 20.8 |
| Tributyl phosphate | 3.2 |
| Glass fiber (1/32 inch) | 5.2 |

The above composition was cured in a 100° C. oil bath for six hours. It had a density of about 1.48 g./cc. at 23° C.

*Example 2*

| Component: | Wt. percent |
|---|---|
| Cyclotrimethylene trinitramine | 50.00 |
| Polyvinyl chloride | 20.00 |
| Methyl methacrylate | 18.55 |
| Lauryl methacrylate | 6.45 |
| Triethyl phosphate | 3.00 |
| Glass fiber | 2.00 |

The above composition was cured for four hours at 100° C.

*Example 3*

| Component: | Wt. percent |
|---|---|
| Cyclotrimethylene trinitramine | 50.0 |
| Vinylite (VYNV) | 20.8 |
| n-Butyl methacrylate | 20.8 |
| Triethyl phosphate | 3.2 |
| Glass fiber | 5.2 |

The above composition was cured approximately four hours at 100° C. The cured explosive compositions were found to have high impact strength, high physical strength and high density, making them suitable for fabrication of high strength weapon casings.

Operable percentage composition limits are: 40 to 80 percent by weight of cyclotrimethylene trinitramine or pentaerythritol tetranitrate, or equivalents thereof, and 60 to 20 percent of a suitable resin. The resin comprises the following components within the percentage composition limits listed.

| Component: | Wt. percent |
|---|---|
| Polyvinyl chloride and/or polyvinyl chloride-polyvinyl acetate mixture | 20–60 |
| Vinyl monomer or mixed monomers (methyl, ethyl, butyl methacrylates; styrene, styrene modified polyesters) | 0–65 |
| Plasticizer or mixed plasticizer (linear or cyclic esters, chlorinated compounds) | 0–40 |
| Milled glass fiber (preferably 1/32" to 1/4") | 0–15 |
| Anitomy oxide | 0–5 |

Examples of styrene-modified polyesters which may be used are the glycol adipate and glycol maleate esters with styrene. In addition to triethyl and tributyl phosphate, other suitable plasticizers are dioctyl adipate, dibutyl sebacate, and dioctyl and dibutyl phthalate.

The above compositions are mixed at temperatures from about 10° C. to about 35° C. and packed or cast into suitable molds. Heating then causes solution of polyvinyl chloride or polyvinyl chloride-polyvinyl acetate mixture and polymerization of the monomeric material or of the styrene modified polyesters as set forth above. Polymerization may be effected at temperatures from 20° C. to 150° C. over times varying from less than one hour to several days.

From the above data it is seen that the invention provides compositions suitable for the manufacture of explosive weapon casings. The compositions can be cured at low temperatures and the cured product has the required explosive characteristics, high density, and high physical strength.

Obviously many modifications and variations of the present invention are possible in the light of the above teachings. It is therefore to be understood that within the scope of the appended claims the invention may be practiced otherwise than as specifically described.

What is claimed is:

1. An explosive composition for use in fabricating weapon casings, consisting essentially of from about 40 to about 80 percent of a high explosive from the class consisting of cyclotrimethylene tetranitrate and pentaerythritol tetranitrate; from about 20 to about 60 percent of a material from the class consisting of polyvinyl chloride and polyvinyl chloride-polyvinyl acetate copolymer; from about 15 to about 65 percent of a polymerizable material from the class consisting of vinyl monomers, lower alkyl methacrylates, and styrene modified esters of glycol adipate and glycol maleate; from about 15 to about 40 percent of a plasticizer from the class consisting of dioctyl adipate, dibutyl sebacate, dioctyl phthalate, dibutyl phthalate and tributyl phosphate; and up to about 15 percent of fiber glass; said composition being curable by polymerization at a temperature from about 20° to about 150° C.

2. An explosive composition for use in fabricating weapon casings, consisting essentially of about 50 percent of cyclotrimethylene trinitramine; about 21 percent of a material from the class consisting of polyvinyl chloride and polyvinyl chloride-polyvinyl acetate copolymer; from about 18 to about 21 percent of a material from the class consisting of butyl methacrylate and methyl methacrylate; from about 3 to about 3.2 percent of a material from the class consisting of tributyl phosphate and triethyl phosphate; and from about 2 to about 5.2 percent of fiber glass; said composition being curable by polymerization at a temperature from about 20° to about 150° C.

3. An explosive composition for use in fabricating weapon casings, consisting essentially of about 50 percent of cyclotrimethylene trinitramine; about 20.8 percent of polyvinyl chloride-polyvinyl acetate copolymer; about 20.8 percent of butyl methacrylate; about 3.2 percent of tributyl phosphate; and about 5.2 percent of fiber glass; said composition being curable by polymerization at a temperature from about 20° to about 150° C.

4. The process of making high strength explosive weapon casings which comprises mixing at a temperature between about 10 and 35° C. from about 40 to about 80 percent of a high explosive from the class consisting of cyclotrimethylene tetranitrate and pentaerythritol tetranitrate; from about 20 to about 60 percent of a material from the class consisting of polyvinyl chloride and polyvinyl chloride-polyvinyl acetate copolymer; from about 15 to about 65 percent of a polymerizable material from the class consisting of vinyl monomers, lower alkyl methacrylates, and styrene modified esters of glycol adipate and glycol maleate; from about 15 to about 40 percent of a plasticizer from the class consisting of dioctyl adipate, dibutyl sebacate, dioctyl phthalate, dibutyl phthalate and tributyl phosphate; and up to about 15 percent of fiber glass; transferring the formed mixture to a suitable mold and heating the mixture at a temperature from about 20° to about 150° C. until polymerization is effected.

References Cited in the file of this patent

UNITED STATES PATENTS

| | | |
|---|---|---|
| 2,067,213 | Snelling | Jan. 12, 1937 |
| 2,069,983 | Ubben | Feb. 9, 1937 |
| 2,131,353 | Marsh | Sept. 27, 1938 |
| 2,165,263 | Holm | July 11, 1939 |
| 2,171,379 | Wahl | Aug. 29, 1939 |
| 2,205,428 | Mitchell | June 25, 1940 |
| 2,606,109 | Kristiakowsky et al. | Aug. 5, 1952 |
| 2,717,204 | Noddin et al. | Sept. 6, 1955 |